(12) United States Patent
Feldis, III

(10) Patent No.: US 7,068,308 B2
(45) Date of Patent: Jun. 27, 2006

(54) REMOVABLE MEDIA HOST EXECUTABLES

(75) Inventor: John J. Feldis, III, Menlo Park, CA (US)

(73) Assignee: Logitech Europe, S.A. (CH)

(*) Notice: Subject to any disclaimer, the term of this patent is extended or adjusted under 35 U.S.C. 154(b) by 1020 days.

(21) Appl. No.: 09/905,682

(22) Filed: Jul. 13, 2001

(65) Prior Publication Data
US 2003/0011688 A1   Jan. 16, 2003

(51) Int. Cl.
H04N 5/76   (2006.01)

(52) U.S. Cl. ................... 348/231.3; 348/207.1

(58) Field of Classification Search ............. 348/231.3, 348/231.99, 231.6, 207.99, 222.1, 231.7, 348/231.9
See application file for complete search history.

(56) References Cited

U.S. PATENT DOCUMENTS

| | | | |
|---|---|---|---|
| 5,477,264 A * | 12/1995 | Sarbadhikari et al. ... | 348/231.6 |
| 5,541,656 A | 7/1996 | Kare et al. | |
| 5,913,088 A * | 6/1999 | Moghadam et al. ........ | 396/311 |
| 5,943,093 A | 8/1999 | Anderson et al. | |
| 6,104,430 A * | 8/2000 | Fukuoka ................... | 348/231.6 |
| 6,115,137 A | 9/2000 | Ozawa et al. | |
| 6,118,480 A | 9/2000 | Anderson et al. | |
| 6,151,069 A | 11/2000 | Dunton et al. | |
| 6,405,362 B1 * | 6/2002 | Shih et al. ................... | 717/174 |
| 6,567,122 B1 * | 5/2003 | Anderson et al. ........ | 348/211.3 |

FOREIGN PATENT DOCUMENTS

EP    946046 A2 *   9/1999

OTHER PUBLICATIONS

Summary of Specification of DPOF Version 1.0, by Canon, Inc., Jul. 17, 2000.

* cited by examiner

Primary Examiner—Ngoc-Yen Vu
Assistant Examiner—Timothy J. Henn
(74) Attorney, Agent, or Firm—Townsend and Townsend and Crew, LLP

(57) ABSTRACT

A method of storing images includes providing an image capturing apparatus. A non-volatile memory medium is inserted into the image capturing apparatus. The non-volatile memory medium is suitable for storing image data. A program is written onto the non-volatile memory medium. The program is capable executing without specific user initiative when the non-volatile memory medium is coupled to a computer to access image data stored in the non-volatile memory medium.

5 Claims, 4 Drawing Sheets

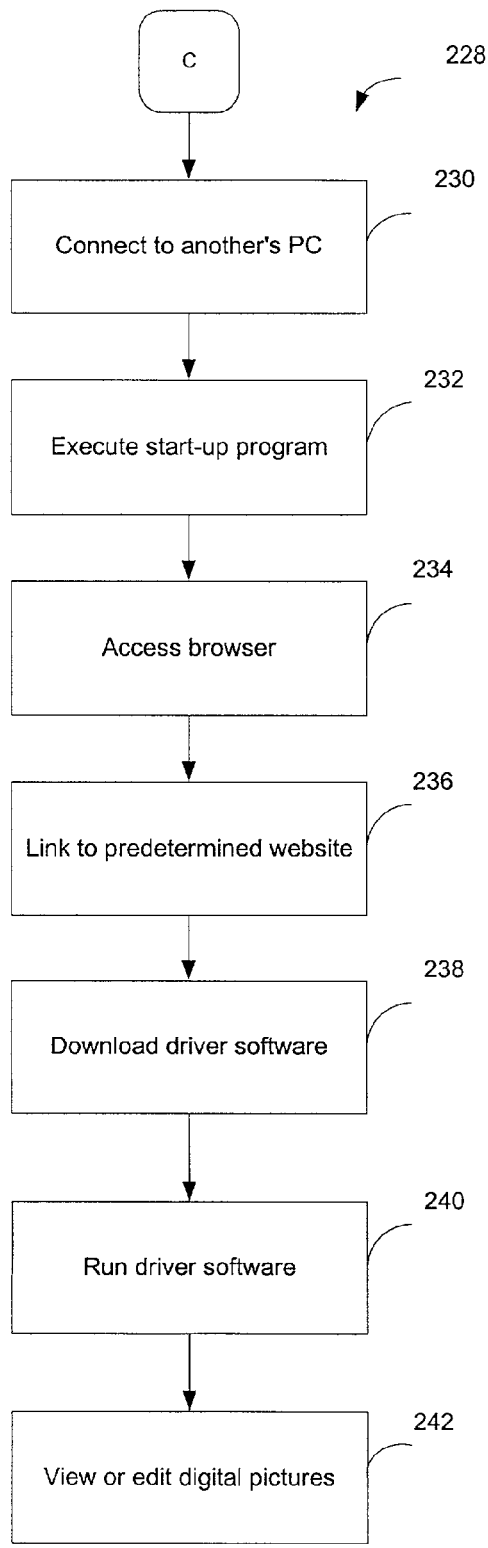
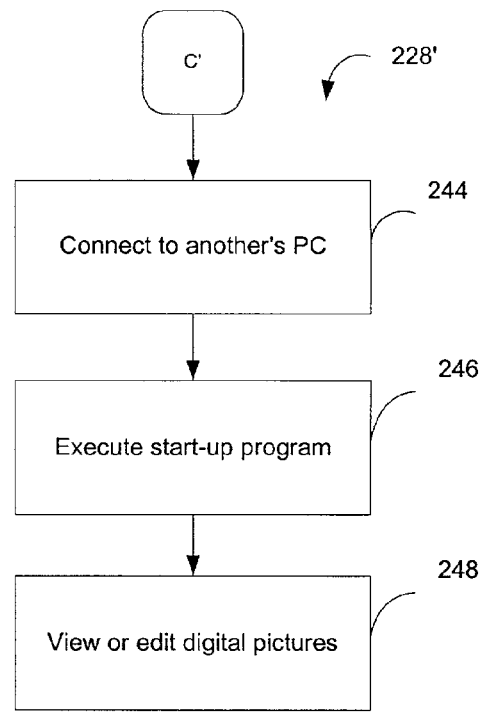
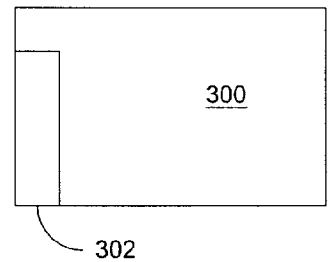
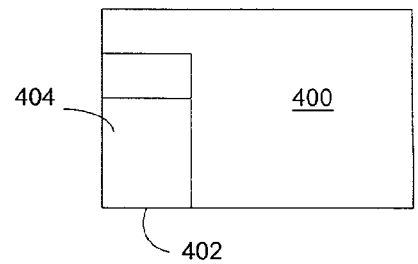
FIG. 2D
FIG. 2E
FIG. 3
FIG. 4

REMOVABLE MEDIA HOST EXECUTABLES

BACKGROUND OF THE INVENTION

The present invention relates to digital camera technology. More specifically, the prevent invention relates to a method and apparatus of accessing images stored in a storage medium using any computer.

Digital cameras have been gaining wide acceptance among consumers recently. As a result, more and more companies are marketing and selling their own brand of digital cameras. The images captured with a digital camera are generally stored in a non-volatile memory, e.g., flash card. To view and edit these images, the digital camera is generally coupled to a computer having a companion application software suitable for accessing the stored images. The companion software is usually provided to the owner of the digital camera when the camera is purchased, which is installed in the owner's computer.

Without the companion software, the images stored in the flash card can be difficult or impossible to access. In addition, since different manufacturers provide different companion software, which may be incompatible with other companion software, a user may find it inconvenient or impossible to access the images stored in the flash card using another person's computer, e.g., while at a friend's house or on a vacation, that does not have an appropriate companion software.

Therefore, it would be desirable to provide a method for accessing the images stored in the flash card in any computer even those without the companion application software installed therein.

BRIEF SUMMARY OF THE INVENTION

The present invention provides a method, and corresponding apparatus, for accessing images stored in a storage medium using any computer. In one embodiment, a method of storing images includes providing an image capturing apparatus. A non-volatile memory medium is inserted into the image capturing apparatus. The non-volatile memory medium is suitable for storing image data. A program is written onto the non-volatile memory medium. The program is capable executing without specific user initiative when the non-volatile memory medium is coupled to a computer to access image data stored in the non-volatile memory medium. In one implementation, the program contains an executable file not an entire application software since storing the application software in the memory medium, such as a flash card, may take too much available storage space.

For a further understanding of the nature and advantages of the invention, reference should be made to the following description taken in conjunction with the accompanying drawings.

BRIEF DESCRIPTION OF THE DRAWINGS

FIG. 2D depicts a simplified flow chart of a third method of utilizing the start-up program of FIG. 2A, according to one embodiment of the invention.

FIG. 2E depicts a simplified flow chart of a method of utilizing of a start-up program according to one embodiment of the invention.

FIG. 3 is a block diagram of a flash card with a first start-up program according to one embodiment of the invention.

FIG. 4 is a block diagram of a flash card with a second start-up program according to one embodiment of the invention.

DESCRIPTION OF THE SPECIFIC EMBODIMENTS

Figure 1:
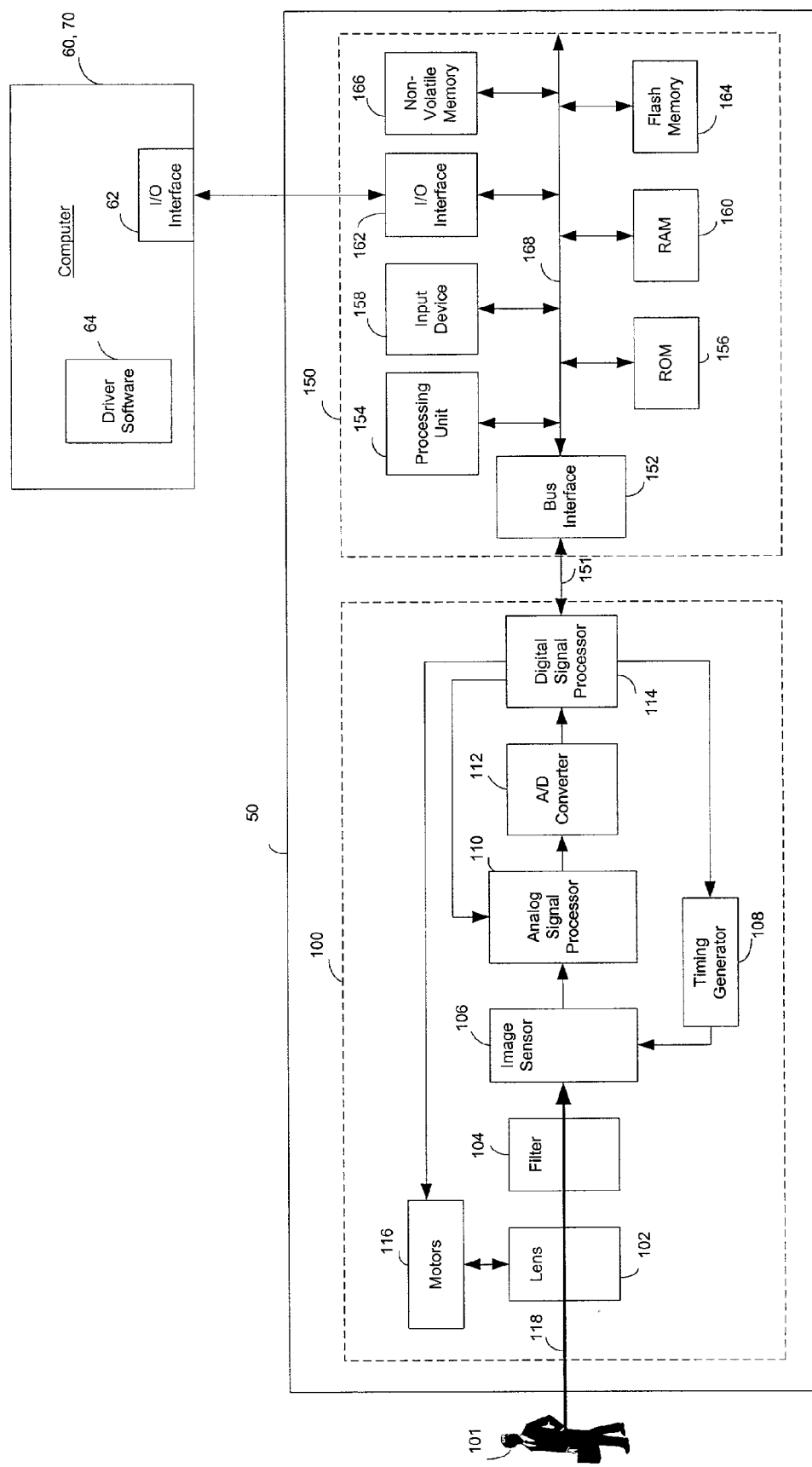
FIG. 1 is a block diagram of a digital camera according to one embodiment of the invention.

Referring to FIG. 1, a digital camera 50 includes an imaging device 100 and a processing system 150. The imaging device includes a lens 102 having an iris, a filter 104, an image sensor 106, a timing generator 108, an analog signal processor (ASP) 110, an analog-to-digital (A/D) converter 112, a digital signal processor (DSP) 114, and one or more motors 116.

In operation, imaging device 100 captures an image of object 101 via reflected light impacting image sensor 106 along an optical path 118. Image sensor 106 generates a set of raw image data representing the captured image. The raw image data is then routed through ASP 110, A/D converter 112 and DSP 114. DSP 114 has outputs coupled to timing generator 108, ASP 110, and motors 116 to control these components. DSP 114 also has its output coupled to processing system 150 via a bus 151. The raw image data are transmitted to system 150 and processed therein.

In one embodiment, processing system 150 includes a bus interface 152, a processor 154, a read-only memory (ROM) 156, an input device 158, a random access memory (RAM) 160, an I/O interface 162, a flash memory 164, a non-volatile memory 166, and an internal bus 168.

Bus interface 152 is a bi-directional first-in, first-out interface for receiving the raw image data and control signals passed between system 150 and DSP 114. Processor 154 executes programming instructions stored in ROM 156 and RAM 160 to perform various operations. ROM 156 generally stores a set of computer readable program instructions which control how processor 154 accesses, transforms and outputs the image data. In one implementation, ROM 156 also stores a start-up program or file that enable a user to access the images stored in the flash memory using any computer whether it has a companion application software installed or not, as explained in more detail below. Alternatively, the start-up program may be stored in another ROM or non-volatile memory.

Input device 158 generally includes one or more control buttons (not shown) which are used to input operating signals that are translated by processor 154 into an image capture request, an operating mode selection request, and various control signals for imaging device 100. I/O Interface 162 is coupled to internal bus 168 and has an external port connector (not shown) that can be used to couple digital camera 50 to a computer 60 via an I/O interface 62 for viewing and editing the image data stored in flash memory 164. The computer includes an application software 64 to access the image data stored in the flash memory. In one implementation, I/O interface 62 is a universal serial bus (USB) port.

Flash memory 164 stores the image data processed by the processor. In one implementation, flash memory 164 is a removable flash card or disk 300 (FIG. 3), e.g., SmartMedia™ and CompactFlash™, so that a user may replace a full flash card with a new flash card to store additional image data. The flash card includes a first start-up program 302 that is copied onto the flash card when the card is first inserted into camera 50. Start-up program 302 is a program that executes automatically without specific user initiative and may include an Internet address of a website having accessing to application software 64. In other implementations, other types of non-volatile memory other than flash cards may be used.

As used herein, the term "without specific user initiative" means a user does not directly input any commands to the computer using an input device (not shown) that is coupled to the computer. Examples of such an input device include keyboard, mouse, voice activation device, and touch screen. An example of a program that executes "without specific user initiative" is an autoplay file in a CD-ROM that runs automatically when the CD-ROM is inserted into a CD-ROM driver.

Non-volatile memory 166 stores an image counter whose current value becomes an identifier for each new set of image data captured by camera 50. The counter is preferably incremented each time a new image is captured.

Figure 2A:
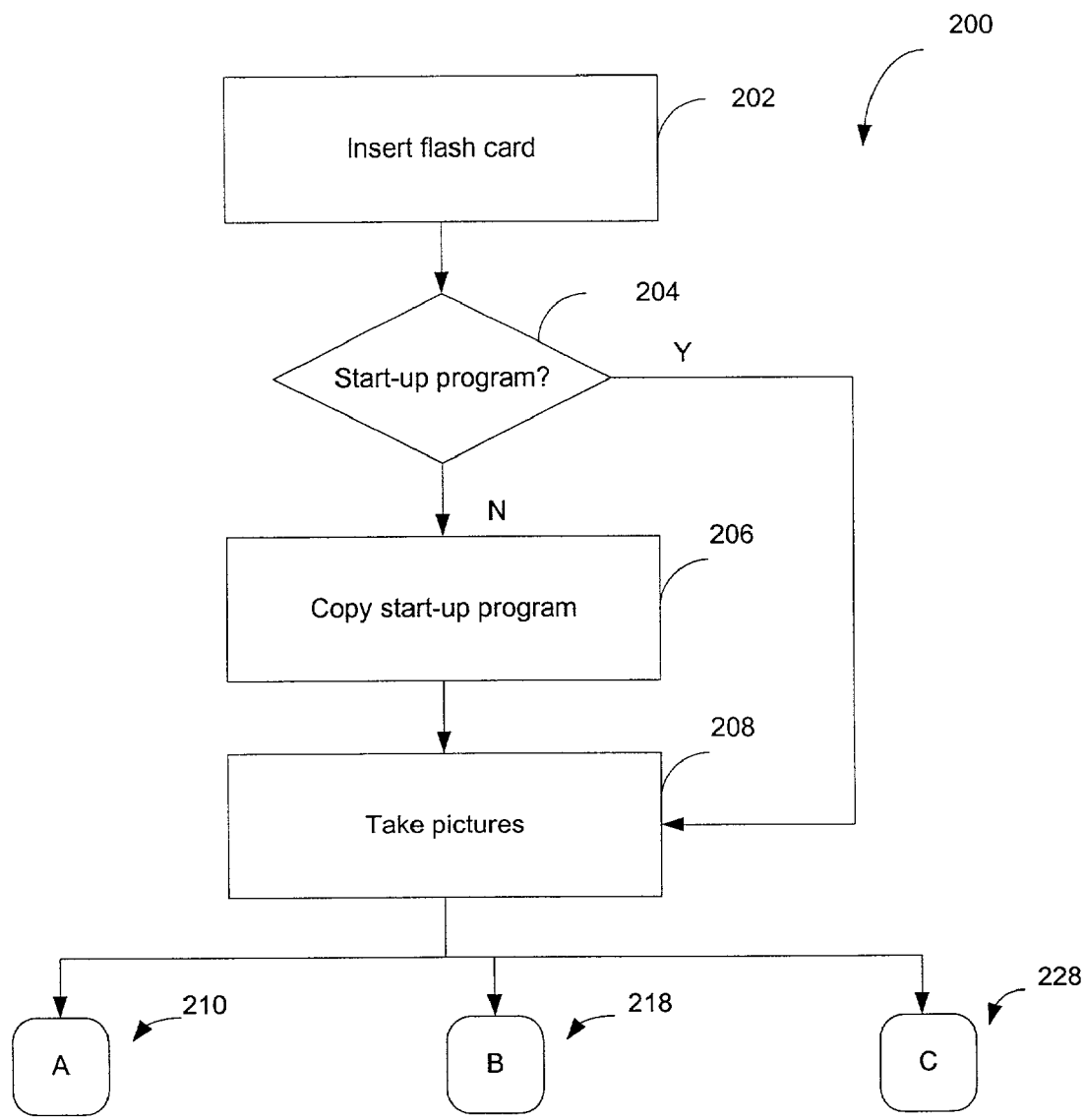
FIG. 2A depicts a simplified flow chart of a process of creating and utilizing a start-up program according to one embodiment of the invention.
Figure 2B:
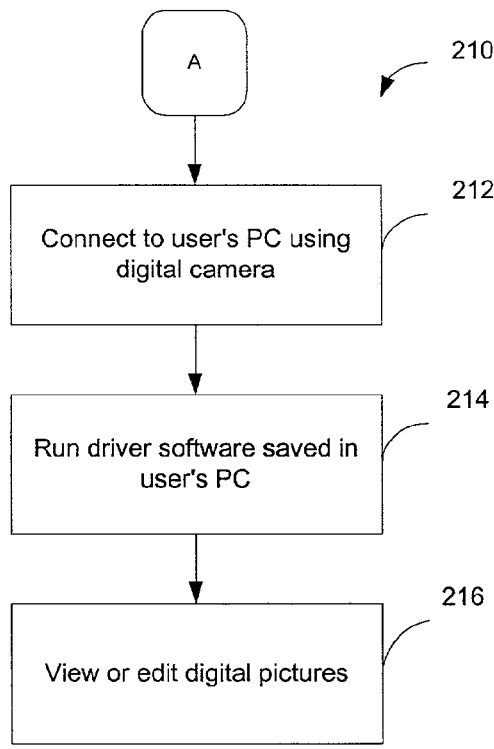
FIG. 2B depicts a simplified flow chart of a first method of utilizing the start-up program of FIG. 2A, according to one embodiment of the invention.
Figure 2C:
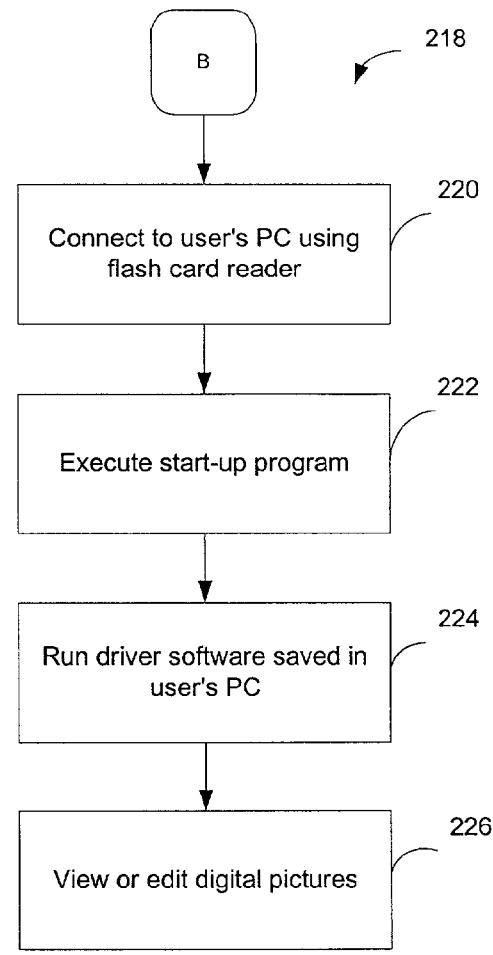
FIG. 2C depicts a simplified flow chart of a second method of utilizing the start-up program of FIG. 2A, according to one embodiment of the invention.

Referring to FIG. 2, a process 200 depicts a method of creating and utilizing start-up program 302, according to one embodiment of the invention. At step 202, flash memory 164 (e.g., a flash card 300) is inserted into camera 50 to store image data processed by processor 154. Process 200 determines whether or not flash card 300 has start-up program 302 (step 204). If not, the processor retrieves the start-up program from ROM 156 and copies it onto the flash card (step 206). Since a new blank flash card generally would not have the start-up program, step 204 may be performed at the time the new flash card is being formatted. For flash cards that has been previously formatted by another digital camera, start-up program 302 may be copied onto the flash card without formatting the flash card.

Once the flash card has been formatted and the start-up program has been copied onto the flash card, a user may commence taking pictures (step 208). At step 204, if the flash card already had start-up program 302, then step 206 is skipped.

After the pictures have been taken and the image data are stored in flash card 300, a user may access the stored image data in various ways. In a first method 210 (FIG. 2B), the contents of flash card 300 are accessed by linking or coupling camera 50 to a computer 60 having an appropriate application or application software 64 installed (step 212). Generally, computer 60 would be the user's own personal computer. In one implementation, the camera is coupled to the computer via a universal serial bus (USB) port.

When camera 50 is coupled to the computer via the USB port, the computer recognizes the camera and runs the application software (step 214). The image data stored in the flash card is viewed and edited using application software 64 (step 216). Under the first method, the benefits of the start-up program is not fully utilized since computer 60 with application software 64 installed therein recognizes camera 50 when it is coupled to the computer.

In a second method 218 (FIG. 2C), the contents of flash card 300 are accessed by using a flash card reader (not shown). Flash card 300 is removed from camera 50 and inserted into the flash card reader that is coupled to computer 60 having application software 64 installed therein (step 220). In one implementation, the flash card reader is coupled to the computer via a USB port. The flash card reader detects the flash card and executes the start-up program (step 222). Alternatively, the start-up program may be executed by processor 154 of the camera or computer 60. The start-up program instructs computer 60 to search for the software in its directory and run the application software to access the contents of flash card 300 (step 224). Thereafter, the contents of flash card 300 is accessed using the software (step 226).

Without the start-up program, the computer would not have known to run the software since the computer would have only detected and recognized the flash card reader but not the flash card inserted in the reader. As a result, the software would not have been run by the computer. The user would have had to manually initiate the software or access the images without running the software by navigating through a complex directory structure, which users may find it inconvenient and/or challenging.

In a third method 228 (FIG. 2D), the contents of flash card 300 are accessed in a computer 70 that does not have application software 64 installed. Such a situation may occur when a user attempts to access the contents of flash card 300 in another person's computer, e.g., while the user is on a vacation. Without the installed software, the contents of the flash card 300 may be difficult to access under conventional methods. However, such a problem does not exist under the embodiments of the present invention.

The start-up program copied onto the flash card enables a user to easily access the contents of flash card 300, as explained below. At step 230, camera 50 having flash card 300 is coupled to computer 70, e.g., via a USB port. Since the software is not installed, the computer does not recognize the camera. However, upon being coupled to the computer, the start-up program copied onto the flash card is executed automatically, i.e., without specific user initiative (step 232). The start-up program instructs processor 154 to activate an Internet browser installed in the computer, e.g., Microsoft Internet Explorer™ or Netscape Navigator™ (step 234). The start-up program provides the browser with a website address, e.g., www.logitech/camera/software, from where the software may be obtained, and causes the browser to create a communication link to the desired website (step 238). The software is then downloaded to the computer (step 238) and is executed (step 240). The contents of the flash card are then viewed and edited using the software downloaded from the website (step 242).

In other implementations, the software is remotely accessed from the computer to view and edit the contents of the flash card without downloading the software to computer 70 since the user may not want the software to be installed in the computer. Computer 70 may be another person's computer and that person may not have any need for the software. Mindful of such situations, the present implementation is directed to not inconveniencing the user with the task of deleting the software from computer 70 after the contents of the flash card have been accessed. Alternatively, the user may be provided with an option of downloading the software or accessing the software remotely without downloading.

Yet in another implementation, the start-up program stored in ROM 156 may be used to activate the software to access the contents of the flash card rather than using start-up program 302 copied onto flash card 300 (FIG. 3). Under this implementation, a user may be provided with an option of whether or not to have the start-up program copied to the flash card.

Referring to FIG. 4, in another embodiment, a second start-up program 402 of a flash card 400 includes a software 404 that can be used to access the contents of the flash card without separately running the application software installed in the computer. In one implementation, software 404 is a companion software that is a stripped version of the application software, having limited features of the application software, such as those sufficient to view and edit the images stored in the flash card and/or perform other key features of the application software. Alternatively, software 404 may be the entire application software or a substantially complete version thereof.

In one implementation, start-up program 402 is copied onto the flash card in a similar manner as described in steps 202 to 206 of process 200. Start-up program 402 may also be utilized similarly with some modifications to third method 228 since the application software does not need to be retrieved from a remote location.

FIG. 2E depicts a method 228' under the present implementation which corresponds to third method 228 described previously. At step 244 following step 208, camera 50 having flash card 400 is linked to the computer, e.g., via a USB port. Upon being coupled to the computer, the start-up program copied onto the flash card is executed automatically, i.e., without specific user initiative (step 246). Start-up program 402, having sufficient software capability, enables the user to view and edit the images stored in the flash card without separately running the application software (step 248).

As will be understood by those skilled in the art, the present invention may be embodied in other specific forms without departing from the essential characteristics thereof. For example, the start-up program stored in ROM 156 is not copied onto the flash card to conserve memory space in the flash card. Methods 228 and 228' are performed by executing the start-up program stored in ROM 156 when the camera is coupled to the computer. Accordingly, the foregoing description is intended to be illustrative, but not limiting, of the scope of the invention which is set forth in the following claims.

What is claimed is:

1. A method of storing images, comprising:
providing an image capturing apparatus;
inserting a non-volatile memory medium into the image capturing apparatus, the non-volatile memory medium being suitable for storing image data;
writing a program onto the non-volatile memory medium, wherein the program is capable of being executed without specific user initiative when the non-volatile memory medium is coupled to a computer to access image data stored in the non-volatile memory medium; and
determining whether the inserted non-volatile memory medium has the program, wherein the program is written if it is determined that the memory medium does not have the program.

2. A method of storing images, comprising:
providing an image capturing apparatus;
inserting a non-volatile memory medium into the image capturing apparatus, the non-volatile memory medium being suitable for storing image data;
writing a program onto the non-volatile memory medium, wherein the program is capable of being executed without specific user initiative when the non-volatile memory medium is coupled to a computer to access image data stored in the non-volatile memory medium; and
formatting the memory medium to make it suitable for storing image data, wherein the program is written onto the memory medium at the time the memory medium is being formatted.

3. A method of storing images, comprising:
providing a digital camera;
inserting a flash card into the image capturing apparatus, the flash card being suitable for storing image data; and
writing a program onto the flash card, wherein the program is capable of being executed without specific user initiative when the flash card is coupled to a computer to access image data stored in the flash card;
storing a digital image into the flash card;
providing a computer to access the stored digital image;
coupling the flash card to the computer, whereby the program is executed without specific user initiative;
accessing the digital image stored in the flash card using the computer;
activating a browser installed in the computer according to instructions of the executed program; and
creating a communication link to a website having access to an application software, the application software being suitable for accessing the digital image stored in the flash card;
wherein the application software is accessed remotely and is not downloaded to access the digital image stored in the flash card.

4. A method of storing images, comprising:
providing a digital camera;
inserting a flash card into the image capturing apparatus, the flash card being suitable for storing image data; and
writing a program onto the flash card, wherein the program is capable of being executed without specific user initiative when the flash card is coupled to a computer to access image data stored in the flash card;

storing a digital image into the flash card;
providing a computer to access the stored digital image;
coupling the flash card to the computer, whereby the program is executed without specific user initiative;
accessing the digital image stored in the flash card using the computer;
activating a browser installed in the computer according to instructions of the executed program;
creating a communication link to a website having access to an application software, the application software being suitable for accessing the digital image stored in the flash card; and
providing a user with an option of downloading the application software or accessing the application software remotely to access the digital image stored in the flash card.

5. A method of accessing images captured with a digital camera, the method comprising:

providing a digital camera having a start-up program that executes without specific user initiative;
inserting a flash card into the digital camera;
copying the start-up program onto the flash card;
storing an image captured by the digital camera into the flash card; and
coupling the flash card to a computer suitable for accessing the stored image, whereupon the start-up program is executed without specific user initiative, the executed start-up program causing an application software to be activated to access the stored image, wherein the application software is available at a remote location from the computer, wherein the application software is activated without downloading core modules of the application software from the remote location.

* * * * *